Nov. 10, 1959 J. M. ROBINSON ET AL 2,912,513

BASE FOR TELEPHONE SUBSTATION SET

Filed Oct. 11, 1954 2 Sheets-Sheet 1

INVENTORS.
James M. Robinson,
Donald A. Lewis,
Leonard J Greshel,
By Brown, Jackson, Boettcher, Dienner
attys Nov. 10, 1959 J. M. ROBINSON ET AL 2,912,513
BASE FOR TELEPHONE SUBSTATION SET
Filed Oct. 11, 1954 2 Sheets-Sheet 2

INVENTORS.
James M. Robinson,
Donald A. Lewis,
Leonard J. Greshel,
By Brown, Jackson, Boettcher & Dienner
Att'ys United States Patent Office 2,912,513 Patented Nov. 10, 1959

2,912,513

BASE FOR TELEPHONE SUBSTATION SET

James M. Robinson, Donald A. Lewis, and Leonard J. Greshel, Galion, Ohio, assignors to North Electric Company, a corporation of Ohio Application October 11, 1954, Serial No. 461,315

2 Claims. (Cl. 179—100)

This invention relates generally to telephones and more particularly to telephone sub-stations.

It has been the practice in the past to design telephone sub-station sets with upwardly extending indentations at points in their lower edges to permit access of the necessary electrical conductors. Not only has this resulted in a telephone sub-station having an objectionable physical appearance, but has also introduced mechanical weaknesses into the side walls of the set resulting in a tendency toward fragility. In the past flashings have been required around the edges of the apertures or indentations to overcome the weakness of the walls and to protect the conductors from undue wear where they enter the sub-station housing. The flashings have further detracted from the appearance of the handset as well as introducing more complex die-forming operations which add to the cost of the units. For example, in the molding operation a thin web of material spreads to close the indentation and a separate grinding operation is necessitated to eliminate it.

The main object of this invention is to provide a new telephone sub-station having a passageway means in its base plate for electrical conductors to eliminate the need for forming conductor openings through its side walls for improving its appearance and strengthening its side walls, while greatly reducing its cost.

It is yet another object of the present invention to provide an improved base plate for a telephone sub-station in which the electrical conductors penetrate the base plate at a substantially flat or oblique angle with respect to the plane of the base plate to minimize undue strain and flexing of the conductors.

Another object of this invention is to provide a new and improved base plate for a telephone sub-station employing improved and novel aperturing means for the passage of lead-in conductors through said base plate without the removal of material therefrom.

It is still another object of this invention to provide an improved base plate for a telephone sub-station in which lead-in conductor apertures or passageways are provided by simple punching operations resulting in productive economies and structural improvements in a base plate of this general class.

The above and further objects, features and advantages of this invention will be recognized by those familiar with the art, from the following description of a preferred embodiment thereof, as illustrated in the accompanying drawings.

Figures 1, 2, 3, 4:
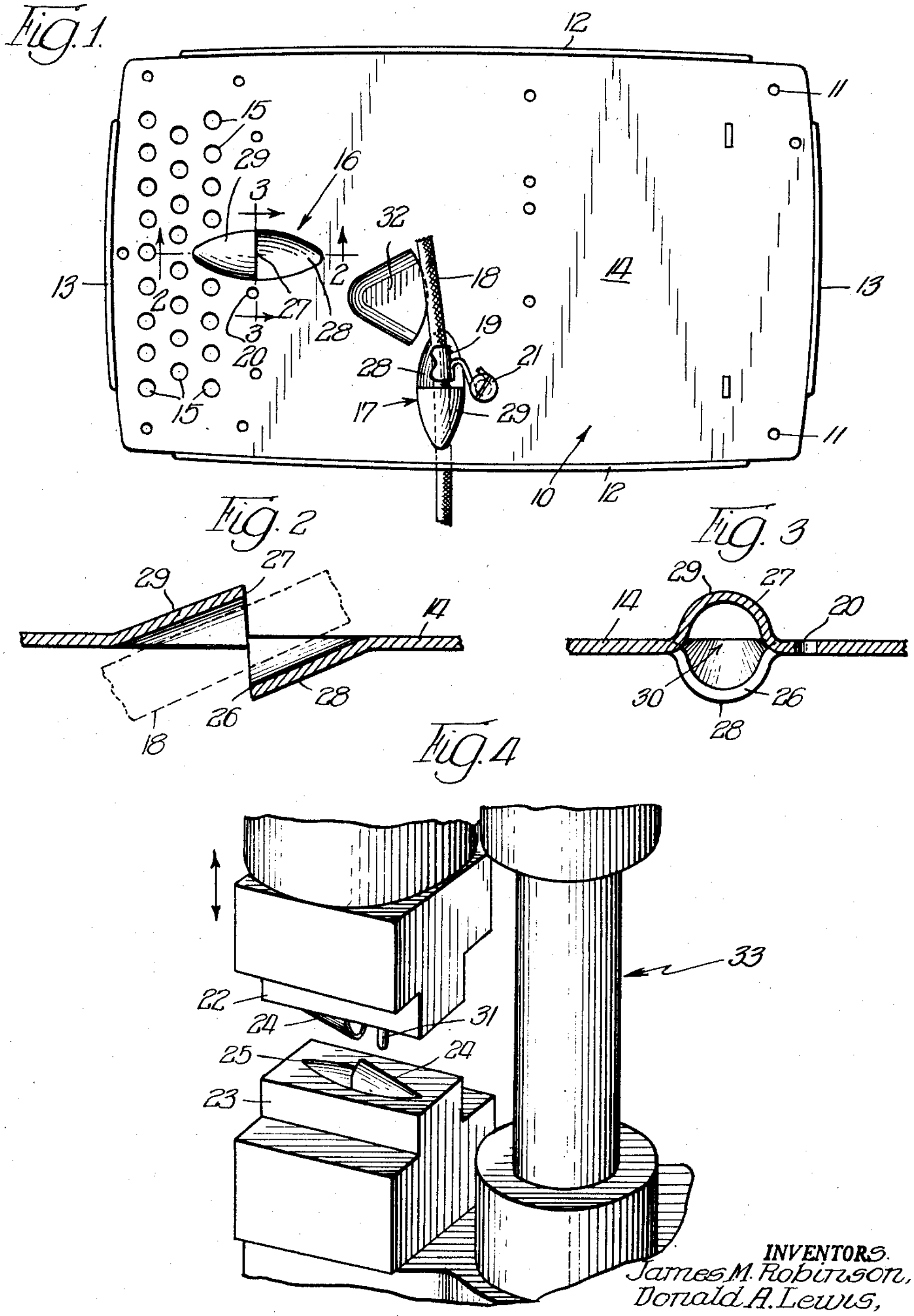
Figure 1 is a top plan view of the base plate of this invention.
Figure 2 is a partial enlarged cross-sectional view taken substantially at line 2—2 of Figure 1 to illustrate the improved lead-in conductor passageway feature therein.
Figure 3 is an enlarged cross-sectional view, similar to Figure 2, taken substantially at line 2—2 of Figure 1.
Figure 4 is a partial perspective view showing the mode of forming the improved conduit passage means in the sub-station set base plate of this invention.

Turning now to the features of the sub-station base plate as illustrated in the drawings, it will be recognized from Figure 1 that a substantially rectangular metal base plate, indicated generally by numeral 10, is provided with openings 11—11 near its corners for the attachment of foot pads (not shown). Upwardly extending lip wall portions 12—12 are formed on opposite side edges thereof and similar lip portions 13—13 are provided along the opposite ends thereof. The plate 10 includes a large planar platform section 14 intermediate the several walls 12 and 13, which forms a suitable base or support area for the attachment of the working elements of a telephone sub-station. A plurality of vent holes 15—15 are provided adjacent one of the end walls 13 and a first conduit passageway means 16 is located adjacent such ventilation openings.

It will be seen that the conduit passageway means 16 is located substantially along the longitudinal center line of the platform portion 14 and that a second like conduit passageway means 17 is provided in substantially transverse relation to passageway means 16 at a position adjacent the transverse center line of the platform portion 14. The direction of the two passageway means 16 and 17 is substantially at right angles to one another, as shown, for the purpose of connecting lead in conductors, such as 18 illustrated, to the working elements of the sub-station which are mounted on top of the platform portion 14. Adjacent each of the conductor passageway means 16 and 17 is located a conductor clip 19 and an opening 20 for the reception of screw means 21 to hold the clip means 19 securely to the upper face of platform 14. It will be understood, however, that the transverse relation of the passageway means and their illustrated location in the platform portion are not necessary to the successful practice of this invention.

Since the formation and construction of each of the conductor passageway means 16 and 17 are identical, a description of one herein, will suffice for both. For example, the passageway means 16 is formulated by a punching operation between male and female dies, as dies 22 and 23 illustrated in Figure 4. It will be noted that each die member 22 and 23 includes a male projection or portion 24 formed substantially as a half cone, or that is, a conical solid severed substantially along a plane passing through the longitudinal center line or axis thereof. Each die also includes a semi-conical depression 25 adjacent the projection 24 thereon; such depression receives a mating male projection 24 of the opposed die when the two dies are brought together. Also note that the base ends of the projections 24 and depressions 25 are adjacent or substantially coplanar.

Bringing such die members into abutting adjacency serves to sever the metal of the platform portion 14 therebetween along a line as defined by leading edges 26 and 27 of a pair of semi-conical surfaces or wall portions 28 and 29 forming the passageway means, as best shown in Figure 2. Such wall portions 28 and 29, respectively, are offset downwardly and upwardly from the plane of the platform portion 14. Separation of walls 28 and 29 is brought about by the shearing action of the die members at substantially the leading edges 26 and 27 of their related conical wall portions 28 and 29. It will also be noted that the oblique slopes of the two conical surfaces or walls are opposed so that such walls parallel each other and form or enclose a somewhat cylindrical passageway or chamber having a substantially circular configuration at a plane passing through the base edges of the wall portions 28 and 29, for example, chamber 30 shown best in Figure 3.

Incidental to the punching operation which forms the conical wall portions 28 and 29 is the provision of a punching pin member 31 on the male die member 22. This pin serves to form and locate the openings 20 for the screw means 21 which hold the conductor clip members 19 to the base plate Also, the platform portion 14 is initially formed with a substantially centrally located recess 32 as shown in Figure 1. Such recess is open along one side and thus provides manual access to a lever member (not shown) associated with the bell tone control of the sub-station elements.

From the above description and the accompanying drawings, it will be understood that through the offsetting or stamping operation performed by the die members 22 and 23 which are held in a press of conventional design, as for example, the press 33 partially illustrated in Figure 4 of the drawings, a new and improved means has been provided for aperturing a plate member or the like to provide a simple passageway therein without the loss of material from the plate and with the provision of improved inclined guideways for an electrical conductor as defined by the sloping surfaces of the semi-conical wall members 28 and 29. This latter feature is of particular importance in the present circumstances since it virtually eliminates all danger of shearing the conductor on the sharp edges of a circular opening in the base plate as happens with more conventional constructions for base plates. The simplicity of providing conductor passageways of this character is believed to mark the present concept and structure as an advanced improvement in this particular art. Also it is felt that the mode of construction taught herein will give rise to improved economies of production and savings of material.

The oblique or relatively flat angle of entrance of the lead wires also avoids a perpendicular turn under the phone base to avoid conflict with the surface upon which the phone is sitting, which feature also guards against breakage of the conductor due to sharp bends.

Figure 5:
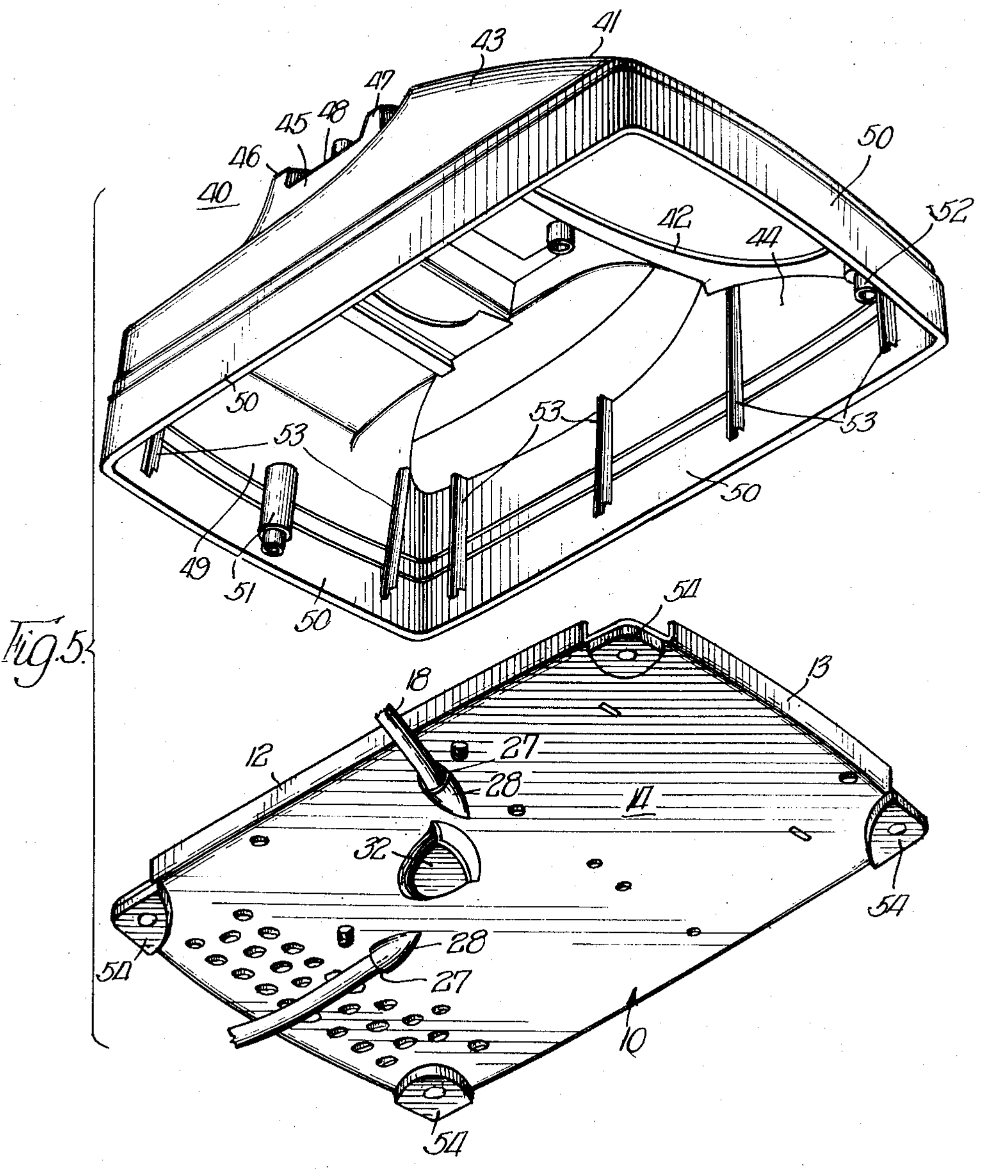
Figure 5 is an exploded perspective view of a telephone sub-station housing and the base plate of this invention.

The base plate of the present invention is shown in its normal environment with respect to the novel telephone sub-station housing in Figure 5. In this figure the sub-set housing 40 is made of a plastic material, such as Bakelite or the like, molded in the form of a hollow housing having sides and connecting portions of relatively thin cross-section. Housing 40 comprises a front sloping portion 41 in which a large circular aperture 42 is cut out for the purpose of receiving the dial mechanism (not shown). Leading rearwardly on either side of sloping portion 41 are two spaced parallel sides 43 and 44 having their lower edges lying coplanar with the lower edge of sloping side 41. The upper edges of sides 43 and 44 slope downwardly and rearwardly from a point abutting the upper edge of sloping side 41 to form depressions in the housing at either side extending to the rear thereof. Offset inwardly of side 43 and extending upwardly is a handset receiving portion 45 which comprises a pair of upwardly extending fingers 46 and 47 between which there is a depressed portion 48 arranged to support the under side of the handset (not shown). Side 45 is concave in form and connected integrally to side 43 and side 41 to form a depression for the reception of the transmitter portion of the handset. A corresponding arrangement of identical structure (not shown) is formed coupling sides 44 and 41 wherein the receiver portion of the handset is disposed. A rear wall 49 integrally connecting sides 43, 44 and handset supporting structure 45 extends downwardly with its lower edge coplanar with the terminating edges of sides 41, 43 and 44. Extending downwardly from and integrally connected to the coplanar edges of sides 41, 43, 44 and 49 is a continuous imperforate strip portion 50 substantially forming a rectangle, the lower edge of which terminates in a common plane, which is substantially coplanar with the flat portion 14 of the base plate when the sub-station is finally assembled. It may be noted that side 50 is continuous and unbroken by any unsightly and weakening apertures or distortions.

Two depending pillars 51 and 52 disposed at either end of the sub-set housing terminate in threaded ends for the reception of bolts (not shown) which fasten platform 14 in its proper position at the bottom of housing 40. A plurality of downwardly extending raised portions or ribs 53 are disposed along the inner surfaces of sides 41, 43, 44 and 49 and terminate at the lower edge of the strip 50. Each of these ribs has a small slot at its lower edge for the reception of a portion of one of the upwardly extending flanges 12 and 13 of base plate 10. Since the sub-station housing 40, thus described, is well known to those skilled in the art and is commercially available, it is believed that a further detailed description of the particular angular relationship between the various sides and top portions is deemed unnecessary.

To support the telephone sub-station a convenient distance above the surface upon which it rests, a plurality of feet or extensions 54, having a felt or other soft cover, are attached to the four corners of plate 10. These individual feet serve not only to protect the supporting surface from scarring but also provide an access area for the electrical conductors which enter the telephone substation at an oblique angle.

The objectionable and unsightly design of conventional telephone sub-sets in which the depending sides abutting the base member must be apertured or distorted in order to receive the electrical leads necessary for the operation of the telephone is thus obviated by applicants' unusual and unique invention. Furthermore, in applicants' invention the depending sides of the housing are not only stronger since they are unapertured, but a savings results from the elimination of an auxiliary grinding operation.

While the invention has herein been described in association with a particular form and embodiment of its inventive concepts, it is obvious that numerous changes, modifications and substitutions of equivalents may be entered into therein without necessarily departing from the spirit and scope of its inventive features. As a consequence, it is not intended that the invention be restricted to the particular form and features thereof illustrated in the accompanying drawings and described herein, except as may appear in the following appended claims.

We claim:

1. A telephone sub-station set of the type having internal operating components comprising, in combination, a sub-station housing having at least one open side for providing access to the operating components located within the confines of the housing and a continuous imperforate strip portion which forms the lower edge of the housing circumscribing said open side, a platform portion for covering said open side and for mounting certain of said sub-station operating components within said housing, a conductor receiving trough-like section having an axis which penetrates said platform portion at an oblique angle, and a conductor extending axially through said trough-like section into said housing, said conductor engaging substantially flush against the exterior surface of said platform portion outwardly of said trough-like section and having no sharp bends therein consequent upon its passage through said platform portion.

2. An improved base plate for introducing at least one conductor within the confines of an associated housing, comprising a unitary plate member, conductor passageway means formed through said unitary plate member comprising a pair of semi-conical wall portions offset in opposite directions from the plane of said unitary plate member, said conical wall portions terminating at their base ends in a common plane and defining at that plane a substantially circular aperture through said unitary plate member, said conical wall portions and said aperture having a substantially common axis extending at an oblique slope to the plane of said unitary plate member for the passage of an electrical conductor axially therethrough and without sharp bends into the interior of said housing; the oblique slope of said two wall portions being substantially parallel for supporting the conductor in its passage therebetween.

References Cited in the file of this patent

UNITED STATES PATENTS

| | | |
|---|---|---|
| 1,376,941 | Johnson | May 3, 1921 |
| 1,628,395 | Doane | May 10, 1927 |
| 2,078,840 | Dorl et al. | Apr. 27, 1937 |
| 2,096,046 | Kuhn et al. | Oct. 19, 1937 |

FOREIGN PATENTS

| | | |
|---|---|---|
| 951,898 | France | Nov. 4, 1949 |